US008086484B1

(12) United States Patent
Gibson

(10) Patent No.: US 8,086,484 B1
(45) Date of Patent: Dec. 27, 2011

(54) METHOD FOR MANAGING COLLABORATIVE QUALITY REVIEW OF CREATIVE WORKS

(75) Inventor: Gregory Edward Gibson, Somerville, MA (US)

(73) Assignee: Helium, Inc., Andover, MA (US)

( * ) Notice: Subject to any disclaimer, the term of this patent is extended or adjusted under 35 U.S.C. 154(b) by 1406 days.

(21) Appl. No.: 11/075,775

(22) Filed: Mar. 8, 2005

Related U.S. Application Data

(60) Provisional application No. 60/553,936, filed on Mar. 17, 2004.

(51) Int. Cl.
*G06F 9/44* (2006.01)

(52) U.S. Cl. .................. 705/7.41; 705/7.29; 705/7.32

(58) Field of Classification Search ............. 705/7.41, 705/7.32, 7.29
See application file for complete search history.

(56) References Cited

U.S. PATENT DOCUMENTS

| | | | | |
|---|---|---|---|---|
| 4,996,642 | A * | 2/1991 | Hey | 705/7.29 |
| 5,862,223 | A * | 1/1999 | Walker et al. | 705/50 |
| 6,081,788 | A * | 6/2000 | Appleman et al. | 705/14.46 |
| 6,493,688 | B1 * | 12/2002 | Das et al. | 706/20 |
| 7,433,832 | B1 * | 10/2008 | Bezos et al. | 705/26 |
| 7,519,562 | B1 * | 4/2009 | Vander Mey et al. | 705/500 |
| 7,519,595 | B2 * | 4/2009 | Solaro et al. | 1/1 |
| 2001/0032156 | A1 * | 10/2001 | Candura et al. | 705/36 |
| 2003/0229476 | A1 * | 12/2003 | Naganarayana et al. | 703/1 |
| 2004/0236723 | A1 * | 11/2004 | Reymond | 707/2 |
| 2004/0268341 | A1 * | 12/2004 | Kenworthy | 717/174 |
| 2005/0203786 | A1 * | 9/2005 | Jessup et al. | 705/7 |
| 2007/0219995 | A1 * | 9/2007 | Heumann et al. | 707/7 |
| 2008/0133417 | A1 * | 6/2008 | Robinson | 705/52 |

OTHER PUBLICATIONS

"Reliability of the PEDro scale for rating quality of randomized controlled trials", by Christopher Maher et al., Physical Therapy; Washington, Aug. 2003. vol. 83, Iss, 8; p. 73.*
"Reliability of Editors' Subjective Quality Ratings of Peer Reviews of Manuscripts", by Michael Callaham, MD et al., The Journal of the American Medical Association; vol. 280 No. 3, Jul. 15, 1998.*
"Reliability of the PEDro scale for rating quality of randomized controlled trials", by Christopher Maher et al., Physical Therapy; Washington, Aug. 2003.*
Reliability of Editors' Subjective Quality Ratings of Peer Reviews of Manuscripts, by Michael L. Callaham; William G. Baxt; Joseph F. Waeckerle; et al., The Journal of the American Medical Association, vol. 280, No. 3, Jul. 15, 1998.*

(Continued)

*Primary Examiner* — Romain Jeanty
*Assistant Examiner* — Pan Choy
(74) *Attorney, Agent, or Firm* — Clock Tower Law Group; Erik J. Heels; Michael A. Bartley

(57) ABSTRACT

A method and system of assessing the quality of a work through a quality review engine. The quality review system efficiently builds a ranked list of works. Competing and collaborating creators review each other's works through a variable, relative-measurement technique. Subject matter creators rate the quality of individual pieces of material, while concurrently being reviewed themselves to assess the level of expertise of each reviewer, and thus, the degree of weight that should be given to the commentary of each reviewer. Each review may itself be reviewed to assess a usefulness of the review to determine the weight the review should be given in the ranking process. Assigned reviews, monitored control works, and other fraud detection devices assure accurate rankings at a low cost.

5 Claims, 2 Drawing Sheets

OTHER PUBLICATIONS

American Zoetrope, pages from Dec. 30, 2003, archive of American Zoetrope website (www.zoetrope.com), retrieved from archive.org on Apr. 25, 2005, 5 pages, American Zoetrope, San Francisco, CA, USA.

Live Planet, Project Greenlight, pages from Mar. 17, 2004, archive of Project Greenlight website (www.projectgreenlight.com), retrieved from archive.org on Apr. 25, 2005, 31 pages, LivePlanet Inc., Santa Monica, CA, USA.

* cited by examiner

METHOD FOR MANAGING COLLABORATIVE QUALITY REVIEW OF CREATIVE WORKS

CROSS REFERENCE TO RELATED APPLICATIONS

This utility patent application claims priority from U.S. provisional patent application Ser. No. 60/553,936, filed Mar. 17, 2004, titled "A System And Method Of Collaborative Quality Review" in the name of Gregory Edward Gibson.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Copyright 2005 Helium Exchange, Inc. All rights reserved.

BACKGROUND OF THE INVENTION

This invention relates to methods and systems for evaluating creative works, information, and products (collectively "works"). The invention relates specifically to methods and systems of quality review.

Quality assessment has long played an important role in the development and success of businesses, individuals, entertainment, and products. Proper identification of a quality work, individual, business, or organization is pivotal to the success of many ventures. Industries such as consumer products and services, entertainment, news/media, health care, publishing, and corporate knowledge management, rely on quality assessment for decision making. Unfortunately, the quality assessment process has generally been time-intensive and/or costly. This is in part due to the consistently higher supply of works compared to the average demand for those works.

This supply of works is provided by Creators. Creators are those who develop potentially valuable works, products, or information. Seekers are those wanting quality products, works or information to produce, market, or use. With improving communication systems, especially the Internet, the ratio of available creators to seekers has increased dramatically. It is typical for a seeker of a particular work to be confronted with selecting a creator of a work from a pool of hundreds or thousands, or more.

Selecting a quality work from such large pools can be overwhelming and discouraging for the seeker. For a given pool of a particular type of work, there typically exists several high quality works. The time expenditure to assess the quality of each work, however, is costly. Many seekers have ceased reviewing unsolicited works from creators because of the sheer volume of such works. Word-of-mouth and personal networks still prevail as methods to find desired works. Personal networks can be effective, but the individuals within the network do not normally review all works from a given pool. Selection through a personal network can result in sub-par works being selected while many quality works remain unreviewed and undiscovered. Like fishing from a pond instead of an ocean, a seeker's probable catch will be smaller than what it could be. Thus the seeker fills the demand without realizing the potential of the supply, while the average creator has little hope of getting noticed. An efficient system of assessing the quality of an ocean of works is desirable.

Prior attempts at providing a system for assessing quality include using an expert review system. In an expert review system, experts specializing in evaluation are compensated for reviewing works and reporting on the quality of each work. While the quality of the review itself is high, expert review systems have disadvantages. One disadvantage is the high cost. Seekers need to compensate expert reviewers under such a system; and decreasing the number of expert reviewers only increases the time commitment. With the expert review process slow or costly, the time savings in using an expert reviewer in finding a quality work is overshadowed by the cost of using expert reviewers. The price of having all works from a pool reviewed can easily surpass any expected return on investment from the eventually discovered work. Some expert review systems are funded by creators, but not all creators have the resources to fund such systems. Finally, the expert review system suffers from a small sampled portion. Whether seekers or creators fund the system, only a portion of the pool is reviewed which means many quality works remain undiscovered.

Another attempt at providing an effective system for assessing quality is a computerized review system. In a computerized review system, evaluation by humans is replaced with machines, computer software or the like. Such computerization enables an entire pool of works to be evaluated at a low cost—but at the expense of accuracy. While some properties of a work can be accurately reviewed by a computer, other properties cannot. Many properties of a work need evaluation at an emotional level to determine human appeal. Software has not been developed to a level where it can review a work and accurately return a human's probable emotional response.

There also exists peer review systems to assess quality. Peer review systems harnesses the most plentiful resource available—the creators' time. The collective resources of the creators fuel the review process. Peer review systems operate by providing a forum in which creators review each others works. The benefit is that Seekers can quickly browse top-rated works, all of which have been evaluated by humans. Operating such a system through a computer network makes large-scale collaboration relatively inexpensive. While this low-cost system produces better results than automated evaluation, current peer review systems suffer from a number of disadvantages.

One disadvantage of peer review systems is the enormous potential for abuse. Since creators are reviewing the works of competing creators, there is an inherent conflict of interest. A practice common to peer review systems is "panning." Panning is rating all the works of one's peers with low scores to improve the relative ranking of one's own works. Another common practice is creating multiple, fictitious user accounts to rate one's own work at the top of the scale. Some peer review systems allow solicitation of reviews, but this encourages users to merely swap good ratings. With a high susceptibility to abuse and fraud, the quality of results from such peer-review systems suffers.

Another disadvantage of peer review systems is providing an accurate and reliable ranking system using reviewers who are not expert reviewers. Traditionally, peer review systems have used scalar method of rating works. For example, a reviewer is asked to rate a work on a scale of 1-10. Averaging the individual ratings from reviewers provides a consensus, but this erroneously assumes that the evaluation skills of each peer reviewer are equal. Such an erroneous assumption often yields misleading or inaccurate results. The scalar method also suffers from dead-ends of the scale. If a reviewer scores an item as "10" on a scale of 1 to 10, and the next reviewed item is better than the last item scored as "10," then entered scores must be changed to compensate for the inaccuracy.

Another measurement technique is a simple relative measurement scale. For example, a reviewer is asked to choose the better of A vs. B. Results are tallied from several A vs. B comparisons. While there are no dead ends with simple relative measurements, this technique less efficiently finds a consensus.

There are several attempts in developing a networked peer review system. Zoetrope Virtual Studios (zoetrope.com) was one of the first websites on the Internet to use peer review technology. Originally just a website where writers could submit their stories to the short magazine "American Zoetrope," Zoetrope began to let writers read and rate each other's stories to help the editors in their talent search. Zoetrope expanded to include screenplays, poetry and other written works with Screenwriting its most popular category.

Zoetrope makes a modest attempt at solving the problem of inaccurate ratings. It gives each user a short list of works upon joining the site. The user must choose four works from this list before being allowed to upload their own work. The user's work, then, is only available for review for thirty days after upload. After that thirty-day period, the user must solicit their fellow members to review their work. This solicitation, however, allows users to swap good ratings—a problem rampant on Zoetrope. While a number of top-ranked works on Zoetrope have been optioned and/or otherwise sold, most users complain about its ineffective rating system.

Project Greenlight (projectgreenlight.com) holds annual contests to find a director and a screenplay for a funded film production. The film production process is recorded as a reality television show complete with dramatic nuggets of director/writer conflict. The first round of each contest requires each contestant to read and review a certain number of their peers' scripts. Unfortunately, Project Greenlight's peer review engine does not protect adequately against panning and other fraudulent reviews. Each reader is required to answer specific questions to make sure that each reader had indeed read the script, but that is the extent of the quality safeguards.

Trigger Street (triggerstreet.com) uses a peer review system to evaluate short films and screenplays. No mechanism is in place to ensure accurate ratings making its ranked lists of questionable quality. Additionally, this peer review system benefits only one film production company, each user must give Trigger Street an exclusive 90-day option on any work that makes the top lists, and no compensation is given to the writer for this option. Another problem with Trigger Street is that a work must receive ten reviews before it can even make the ranked list. Since users can pick the work they choose to rate, most of them choose from the top of the list. This makes it difficult for a user to equitably get his works on the list.

Therefore, what is needed is a collaborative evaluation system that minimizes the work load of the evaluators while producing high quality evaluations from a large pool of works. What is further needed is a collaborative evaluation system that accurately calculates ranked works, prevents fraudulent reviews, and provides an incentive for quality reviews.

SUMMARY OF THE INVENTION

The present invention overcomes the problems and limitations of prior evaluation systems and provides additional advantages with a method and system for collaborative quality review. A system of comparisons (A vs. B) sorts items rather than the standard scalar method (rating from one to ten). The system of comparisons includes variable measurement devices to accurately rate a large group of works while the review load of each reviewer is relatively small. Additional devices, such as control works, prevent a reviewer from subverting the system by rating all works of others low while rating his work high. Reviewers that try to cheat the system in this and other ways are easily identified by the system.

This invention uses variable relative measurement techniques but provides an evaluator with multiple choices. A reviewer is not simply asked if Work A is better than Work B, but is asked how much better Work A is than Work B. This variable measurement technique allows the system to accurately rank results using fewer comparisons than is required with a simple relative measurement system.

Creators rate the quality of individual works of other creators, while concurrently being reviewed themselves to assess the level of expertise of each reviewer. By assessing the level of expertise of each reviewer, the system learns the degree of weight that should be given to the commentary of each reviewer. Though the overall ranking of a work is based on the measurement from the variable relative reviews, the weight given to each review may vary when considering the quality of the reviewer. Optionally, each review can receive a usefulness rating. The present invention also accommodates any combination of creators, seekers, and experts as reviewers of works. Thus creators and experts may collaborate on the evaluation of a collection of works.

An advantage of the present invention is a low operating cost while benefiting both creators and seekers. Seekers benefit from an automated system that increases efficiency through which works of talent are identified. Creators benefit from saving time and money trying to contact seekers, while receiving plenty of useful feedback in the process.

Another advantage is the reduced number of sorts required for accurate reviews. The present invention is driven by a predictive mathematical algorithm (process) that lowers the number of sorts a reviewer must do to create a highly accurate, sorted list. It also minimizes the work by including an item the reviewer has already seen when presenting another pair of items to compare.

Another advantage afforded by the present invention is the practical elimination of fraudulent ratings. The combination of the variable relative ratings system and control works scattered within groups of works, results in easy identification of fraudulent ratings. The control works include real and/or fake works that are known to be either high or low quality works. If a reviewer gives a review of a control work that is contrary to the known quality of that control work, then the system can mark reviews from that reviewer as either fraudulent or incompetent and not consider such reviews for ratings calculations.

An optional usefulness of review rating feature compensates for varying levels of expertise of the reviewers. When a creator rates a work, the creator may also write a review. A review is a detailed analysis of the merits and shortcomings of a work, written for the purpose of helping the creator improve his skills. When the creator of the work receives a review, the creator rates the review according to how useful the comments are. Thus, each creator may receive a composite usefulness score which is the average of all usefulness scores received for each review the creator submits. The system accommodates separate review usefulness ratings for each category in which a creator submits reviews. Reviewers that consistently offer good feedback are considered to have a greater ability to judge the quality of a work. Reviews from such expert reviewers are given appropriate weight when considered in the ratings calculation. Thus, weighting reviews creates an incentive for providing quality reviews of works.

Thus the present invention creates an evaluation system with benefits valuable to both seekers and creators of works. It minimizes the evaluation work load while maximizing consensus accuracy. The present invention increases the efficiency with which works of talent are rated and sorted. The transaction cost, of discovering quality works, is reduced. Fraudulent ratings are virtually eliminated. And the highest quality content is selected from a broader pool of mixed quality material.

DETAILED DESCRIPTION OF THE INVENTION, INCLUDING THE PREFERRED EMBODIMENT

Operation

Figure 1:
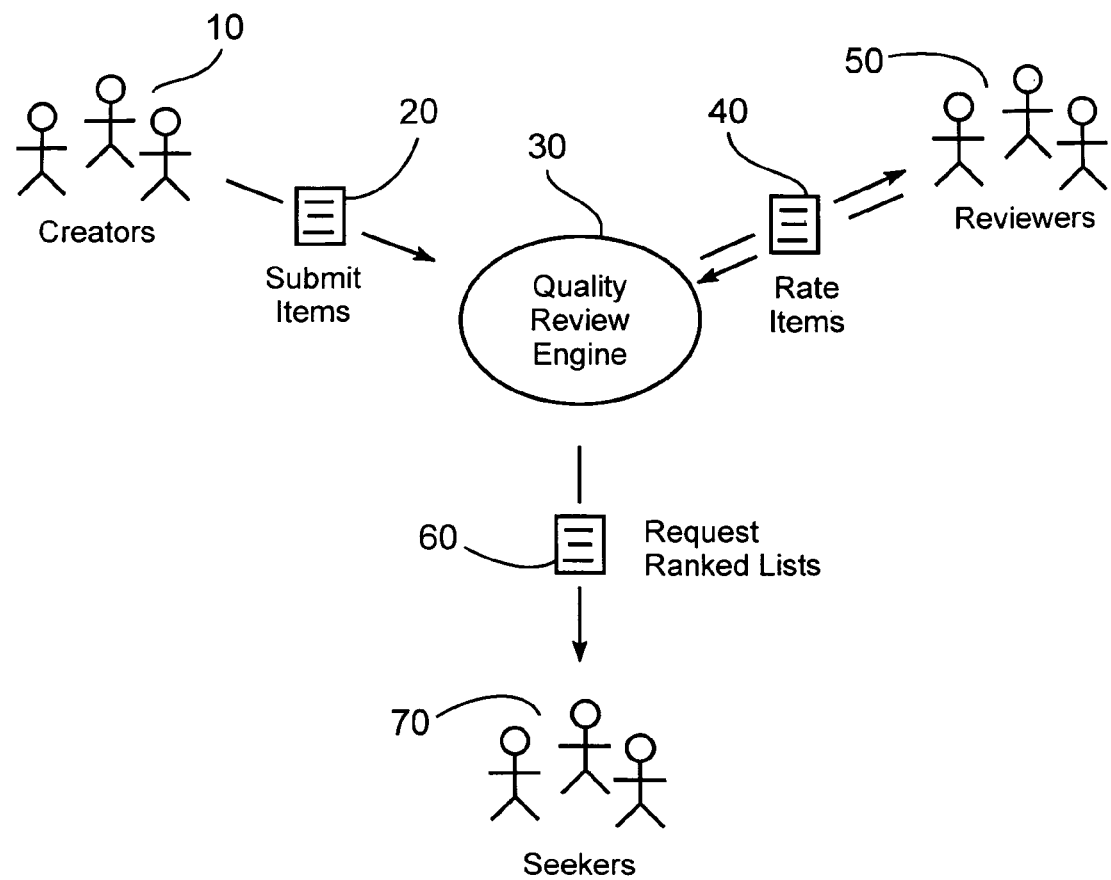
FIG. 1 shows an overall structure of the collaborative review system.

The present invention is a new breed of quality-review system. It is a bi-directional, competitive, quality review. The present invention is preferably embodied in a Internet application know as a Quality Review Engine (QRE). The QRE operates through a website using the collaborative powers of the Internet to assess the quality of creative works, while giving the creators of those works critical commentary. QRE users review and rate each other's works, which then become part of a ranked list. The ranked list is made available to potential purchasers (seekers).

The benefit of the QRE is readily apparent when compared to the previous system of discovering and assessing quality. For an application example, consider that the editor of an engineering magazine needs to publish a feature article on hydrogen fuel cells within four months. Over the course of the next couple of months the editor receives proposals and writing samples from 100 freelancer writers. Assuming the editor takes twenty minutes to review each submission, then the editor would spend a total of 33 hours reviewing submissions before selecting a writer for the job. If the editor's salary is $50K per year, then the cost, in the editor's time, to find a writer for each article is approximately $1,000.

Now contrast this approach with the editor using the QRE of the present invention. With the present invention, the editor submits an article request to the QRE over a network. During the next couple of months 1,000 freelancer writers read and rate each other's submissions. The editor then selects the top 20 submissions from the final, reviewed list by simply downloading the submissions. The editor reads each one and selects a writer. The cost in the editor's time to find a writer is substantially less, plus the quality of the samples reviewed is dramatically better.

The QRE may include a Usefulness Score of a user's review. A user's Review Usefulness Score may be determined and considered when calculating the overall rating of a work as an additional measure for assuring quality reviews. An average rating, weighted by each user's Review Usefulness Score, is calculated as follows. Where WR=Work Rating; CRUS=Composite Review Usefulness Score; n=number of reviews for that Work, and a=constant. This mechanism dramatically reduces the effect of panning because a panner receives a low Review Usefulness Score thereby reducing the weight of the panner's rating when calculating the composite rating of a work.

The QRE may include a Review Effort score. The QRE can ask creators to rate a review according to how much effort it appears the reviewer made. This rating is a creator's Review Effort Score. The Review Effort score is used as a mechanism to ensure that reviewers are motivated to give useful reviews. The Review Effort won't affect the scores given to a user's works if the user has a low Usefulness Score. The greater a creator's Review Effort Score, the more frequently the creator's work is reviewed. In addition, creators with higher Review Effort Scores will receive reviews from users with high Usefulness Scores. Thus a creator demonstrating high effort is rewarded with useful reviews of the creator's works.

The preferred mode of the QRE is to assign works to be reviewed. This prevents creators from conspiring to review works of co-conspirators. Not only does this mode reduce the possibility of fraudulent reviews, but this also works to reward creators receiving high Usefulness Scores with more reviews from high-quality reviewers.

The QRE has many alternative modes of operation. In one mode, the QRE allows users who do not have works in the system to submit reviews. The resulting reviews earned can be assigned to another creator, so that the creator will get more reviews for the creator's work. In another mode, creators may purchase reviews from users with exceptionally high Usefulness Scores. While these reviews won't include a work rating because of the conflict of interest, creators can benefit from the high level of expertise. In another mode, the QRE blends creator reviews and expert reviews, to achieve a desired ratio of accuracy and cost.

Referring to FIG. 1, creators 10 submit items 20 to quality review engine 30. Reviewers 50 review and rate items 40 submitted to quality review engine 30 according to the present invention. Quality review engine 30 sorts rated items. After items are ranked and sorted, Seekers 70 request ranked items 60 from quality review engine 30.

Figure 2:
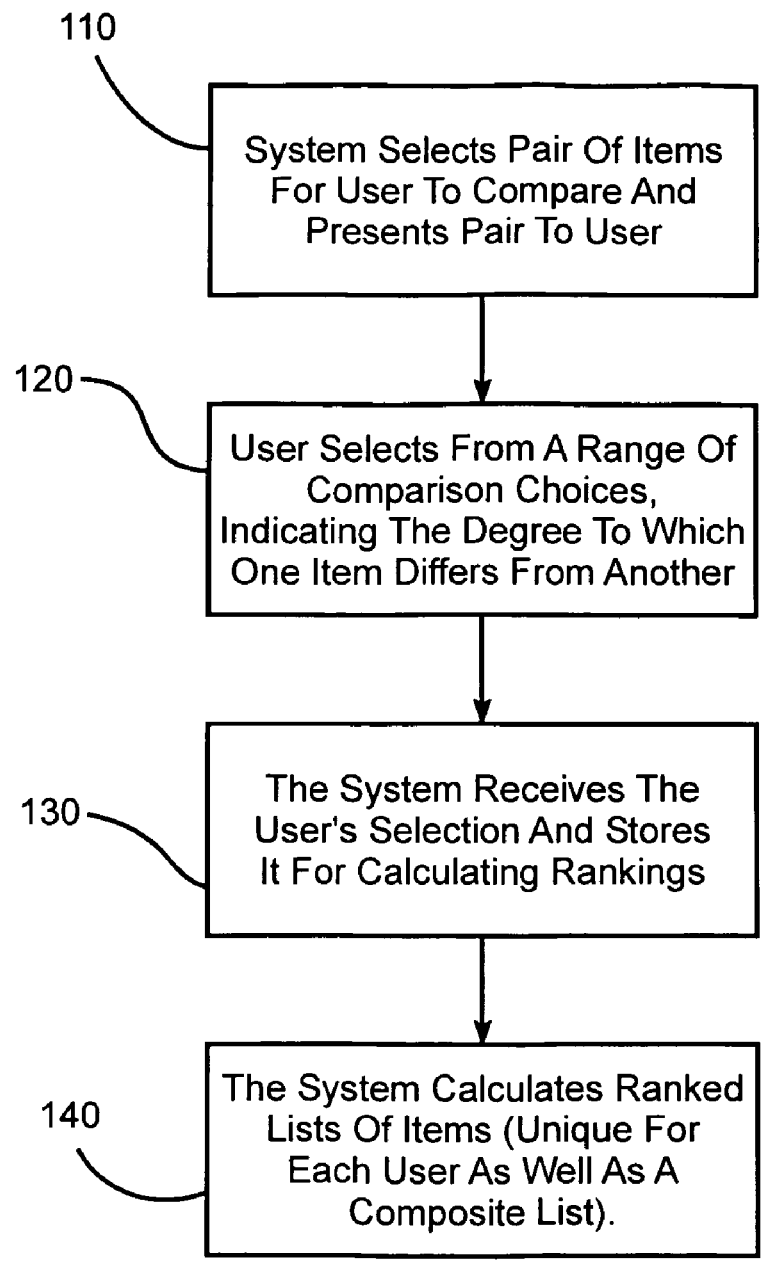
FIG. 2 is a flowchart showing the review process.

Referring to FIG. 2, after creators 10 submit items 20 to quality review engine 30, the system selects a pair of items for a user to compare and presents these two items to a user in step 110. In step 120, a user selects from a range of comparison choices and indicates the degree to which one item differs from another. In step 130, the system receives and stores the user's selection for calculating a rating. In step 140, the system calculates ranked lists of items. These items can be unique for each user as well as being a composite list.

While the preferred embodiment of the invention operates best with creative works, the invention can be applied to information, new consumer products, service providers and so forth. Works, as described herein, includes works and information of all kinds. For example, a company can use the system within a product development division to gauge product quality. Another embodiment is reviewing quality of more abstract items such as websites. Also, the invention can be used in professional services fields such as use in the medical field as a means of rating physicians and health organizations.

What is claimed is:

1. A method of operating a quality review internet application engine comprising:

receiving, over the internet to a processor, a plurality of creative works from creators;

presenting, over the internet from the processor to a reviewer, a pair of creative works to rate, wherein the pair of creative works is selected from the plurality of creative works;

providing, to the reviewer from the processor, multiple choices for rating the pair of creative works based on variable relative measurements;

receiving, by the processor from the reviewer, a single variable relative rating for the pair of creative works provided to indicate the degree to which the works differ;

receiving, by the processor from the reviewer, a written review of a creative work rated by the reviewer;

weighting, by the processor, the received single variable relative ratings based on reviewer expertise;

comparing, by the processor, the weighted variable relative ratings;

maintaining a plurality of control creative works of known high or low quality, wherein the control creative works are mixed among the creative works to be rated;

identifying, by the processor, a fraudulent rating from the reviewer based on the received single variable relative rating being contrary to the known quality of one of the control creative works;

marking all variable relative ratings received from the reviewer as fraudulent when any of the reviewer's variable relative ratings are identified as fraudulent ratings;

repeating the presentation of pairs of creative works to the same or different reviewers at least until all works in the plurality of creative works have received at least one non-fraudulent variable relative rating to another creative work;

sorting and ranking, by the processor, all creative works in order from best to worst based on weighted variable relative rankings;

requesting, from the processor, over the internet to creators to rate individual written reviews according to how much effort written reviewers made; and increasing, by the processor, the frequency of inclusion of works from creators with higher review effort scores in presentation of pairs of creative work to be rated.

2. The method of claim 1, wherein the pair of creative works includes a creative work previously rated by the reviewer.

3. The method of claim 1, wherein the steps further comprise receiving, at the processor from creators, review usefulness scores for written reviews of creators' rated creative works.

4. The method of claim 1, wherein the steps further comprise applying a degree of weight to commentary from the written review.

5. The method of claim 1, wherein the steps further comprise requesting a creator to rate a written review of a creative work that the creator submitted.

* * * * *